US012641125B2

(12) United States Patent
Shemer et al.

(10) Patent No.: US 12,641,125 B2
(45) Date of Patent: May 26, 2026

(54) AUTOMATED EDGE DRIVEN COLLABORATIVE DATA PROTECTION POLICY MANAGEMENT IN LARGE SCALE EDGE ENVIRONMENTS

(71) Applicant: Dell Products L.P., Round Rock, TX (US)

(72) Inventors: Jehuda Shemer, Kfar Saba (IL); Girish Balvantrai Doshi, Pune (IN)

(73) Assignee: Dell Products L.P., Round Rock, TX (US)

( * ) Notice: Subject to any disclaimer, the term of this patent is extended or adjusted under 35 U.S.C. 154(b) by 399 days.

(21) Appl. No.: 18/168,960

(22) Filed: Feb. 14, 2023

(65) Prior Publication Data

US 2024/0275821 A1    Aug. 15, 2024

(51) Int. Cl.
H04L 9/40 (2022.01)
(52) U.S. Cl.
CPC .................................... H04L 63/20 (2013.01)
(58) Field of Classification Search
CPC ................................ H04L 63/20; G06F 21/60

USPC .......................................................... 726/1
See application file for complete search history.

(56) References Cited

U.S. PATENT DOCUMENTS

| | | | | |
|---|---|---|---|---|
| 2023/0141909 A1* | 5/2023 | Truscott | .............. | G06F 11/1469 726/23 |
| 2024/0370251 A1* | 11/2024 | Malladi | .................. | H04L 67/12 |

FOREIGN PATENT DOCUMENTS

| | | | | | |
|---|---|---|---|---|---|
| CN | 107977238 A | * | 5/2018 | ............. | G06F 3/167 |
| CN | 108733371 A | * | 11/2018 | ............... | G06F 8/38 |

* cited by examiner

*Primary Examiner* — Aubrey H Wyszynski
(74) *Attorney, Agent, or Firm* — Workman Nydegger

(57) ABSTRACT

One example method includes deploying a lightweight data protection component to an edge node of an edge computing environment, receiving, from the edge node, a declaration file comprising an operational attribute that is specific to data residing at the edge node, choosing a central data protection policy, deriving, using the central data protection policy, a hybrid data protection policy that comprises the operational attribute, and transmitting the hybrid data protection policy to the edge node, and the hybrid data protection policy is configured, when executed, to perform a data protection operation on the data residing at the edge node.

20 Claims, 4 Drawing Sheets

208 — DECLARATION FILE

206 — LIGHTWEIGHT COMPONENT

216 — COMBINED POLICY

1 - LIGHTWEIGHT COMPONENT PUSHED ONTO EDGE

2 - DECLARATION FILE SENT (OR PULLED) TO CENTRAL SERVER

200

PROTECTION ENABLED SYSTEMS

206

EDGE CLIENT

208

EDGE CLIENT — 214

UNPROTECTED SYSTEM

FAR EDGE

202

1

2

CENTRAL DATA PROTECTION SOLUTION 216 210

NEAR EDGE / DATA CENTER / CLOUD

204

AUTOMATED EDGE DRIVEN COLLABORATIVE DATA PROTECTION POLICY MANAGEMENT IN LARGE SCALE EDGE ENVIRONMENTS

FIELD OF THE INVENTION

Embodiments of the present invention generally relate to data protection. More particularly, at least some embodiments of the invention relate to systems, hardware, software, computer-readable media, and methods, for implementing data protection for systems and devices operating in an edge computing environment.

BACKGROUND

Edge computing deployments, especially at far and functional edges, may be dynamic and may involve a large number of edge devices. For example, the type, and number, of edge devices may change on an ongoing basis. Moreover, an edge computing environment may have hundreds, thousands, or more, of edge devices, all of which may be generating new and/or modified data. Thus, configuring data protection for systems and devices in an edge environment, by way of a centralized data protection solution user interface, can be tedious, challenging, and prone to error.

In more detail, a variety of factors may be present that can complicate the implementation of data protection for systems and devices operating in an edge computing environment. One such factor is that there may be a large number of deployments, or edge systems/devices, in an edge computing environment. Another factor is that edge computing environments are often dynamic and new deployments come online, while others are decommissioned, on an ongoing basis. Still another factor that may complicate protection of edge data is that there may be many, and varying, edge workload types and data protection requirements. For example, data-related considerations such as backup scheduling, and data retention policies, may vary from one edge device/system to another. Another factor that complicates data protection in edge environments is that the backup admin typically lacks the knowledge and information needed to perform timely and effective backups. For example, the backup admin may not be aware of the type(s) of workloads begin performed in a given edge deployment, nor aware of the data protection needs of an edge device/system deployment. The backup admin may likewise lack awareness of, and insight into, new edge system/device deployments. As a final example of a factor that may complicate, or even prevent, data protection in an edge environment, there are typically far too many far edge deployments to be managed by an edge admin. To complicate matters further, there is edge local information for data protection held by the edge platform and/or by the applications running on the edge platform, but this information is typically inaccessible by a centralized backup admin.

Some of these problems may be understood in terms of the so-called pet/cattle approach to maintenance and management. High touch "pet" approaches to data protection are infeasible due to the scale of the system, as noted in the foregoing discussion, and "cattle" approaches may be better suited for at least some aspects of data protection in edge computing environments, although centralized management of some aspects of data protection may still be called for.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
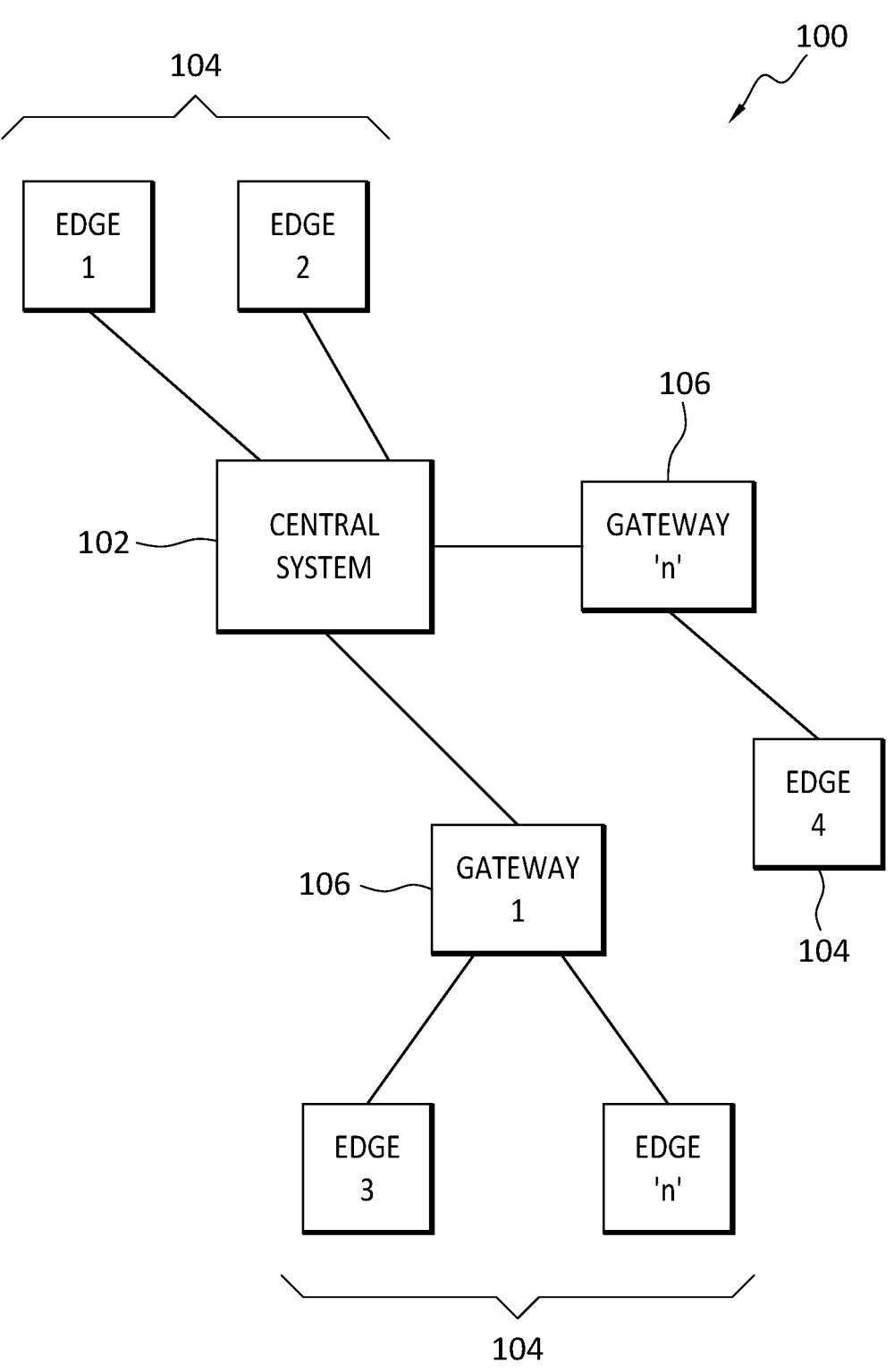
FIG. 1 discloses aspects of an example operating environment for an embodiment of the invention.

Some embodiments of the present invention generally relate to data protection. More particularly, at least some embodiments of the invention relate to systems, hardware, software, computer-readable media, and methods, for data protection for systems and devices operating in an edge computing environment.

In general, an embodiment of the invention may comprise a hybrid approach to data protection policy creation for implementation and management of data protection in edge computing environments. An embodiment may separate the behavioral policy traits managed centrally, and operational policy traits derived automatically by edge locations. The combined, or hybrid, policy system may produce a central control paradigm, such as may be used in a standard data protection system, while implementing the additional functionality of using targeted automation for large scale edge management, thus creating a manageable system for protection of new and/or modified data generated in/by an edge computing environment.

An embodiment may comprise definition and deployment of a lightweight component on the edge that handles the edge local configuration discovery, and communicates configuration information to a central location. At the central location, policy behavioral aspects may be merged with that configuration to define a hybrid data protection policy that is, at once, specific in some respects to the edge system/device, while also incorporating general, or environment-wide, data protection considerations generally applicable to the edge computing environment. In an embodiment, one or more aspects of a policy may be overridden by an edge system/device, or by a central manager.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, one advantageous aspect of an embodiment of the invention is that a hybrid data protection policy may be defined and implemented that accounts both for local considerations at an edge device/system, and for still other considerations that may be generally applicable to the overall environment in which the edge device/system operates. An embodiment may implement a customized data protection policy specific to an edge system/device, or a subset of edge systems/devices in an edge computing environment. An embodiment may define and implement data protection policies that may be automatically updated in response to a change in conditions and/or configurations in an edge computing environment. An embodiment may automatically on-board a newly added edge system/device with a customized data protection policy specific to that edge system/device. An embodiment may enable an edge system/device to play a role in the definition and implementation of its data protection policy. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in connection with the use of data backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated, such as in an edge computing environment for example, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics. Example cloud computing environments, which may or may not be public, include storage environments that may provide data protection functionality for one or more clients.

In addition to the cloud environment, the operating environment may also include one or more clients, such as edge systems and edge devices, that are capable of collecting, modifying, and creating, data. As such, a particular client may employ, or otherwise be associated with, one or more instances of each of one or more applications that perform such operations with respect to data. An edge system/device may comprise, for example, autonomous devices such as vehicles and drones, IoT (internet of things) devices such as sensors and appliances. These edge system/devices are presented only by way of example, and are not intended to limit the scope of the invention in any way.

It is noted that as used herein, the term 'data' is intended to be broad in scope. Thus, that term embraces, byway of example and not limitation, virtual machines (VM), data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may comprise a central system 102 such as, for example, a near edge site, a datacenter, or cloud site. The central system 102, which may host a centrally controlled and managed data protection system, and possibly other systems as well, may communicate with various far edge nodes 104, that may each comprise a respective edge system/device, and which may collectively define an edge computing environment. One or more of the far edge nodes 104 may communicate with the central system 102 by way of a gateway 106. There may be any number 'n' of far edge nodes 104, and any number 'n' gateways 106, where 'n' is any integer equal to or greater than 1.

B. Overview

As noted herein, manual admin management of data protection at edge locations, at scale, is not feasible. Moreover, dynamic environments where edges are deployed and decommissioned frequently exacerbate the management problem. To accommodate the variability between/among far edge nodes, a fixed configuration applicable to all of the nodes is ineffective and, thus, centralized or standardized data protection approaches cannot be effectively applied in edge computing environments.

Thus, an embodiment may comprise a collaborative framework that may enable edge nodes to declare and govern some attributes of data protection, while other data protection attributes may be be governed by a central data protection system configuration. An embodiment may account for a logical separation between system governance aspects which may be well suited for central management, and operational aspects which may be local to specific edge deployments such as, for example, file locations and protection destinations. Note that as used herein, an 'edge node' embraces, but is not limited to, far edge nodes, and systems/devices deployed at an edge location.

In an embodiment, the operational aspects may be relatively more straightforward to derive, especially in edge locations, since edge systems/devices may tend to be smaller, there is usually little to no manual intervention in their configuration—that is, they may be configured automatically, and less variability in data locations and choices. An embodiment may deploy a lightweight component on one or more far edges that may perform, or direct performance of, discovery of the edge local configuration, and then communicate information describing the configuration to a central location, which may host a central system that comprises data protection functionality, where the policy behavioral, or system governance, aspects are merged with the configuration information to define a data protection policy specific to a particular far edge, or group of far edges. An embodiment may enable overrides of policy parameters and requirements in particular cases. Thus, an embodiment may address lifecycle issues, variance between respective far edge configurations, application specific preferences, backup operations, and centralized policy derivation.

C. Aspects of Some Example Embodiments

Figure 2:
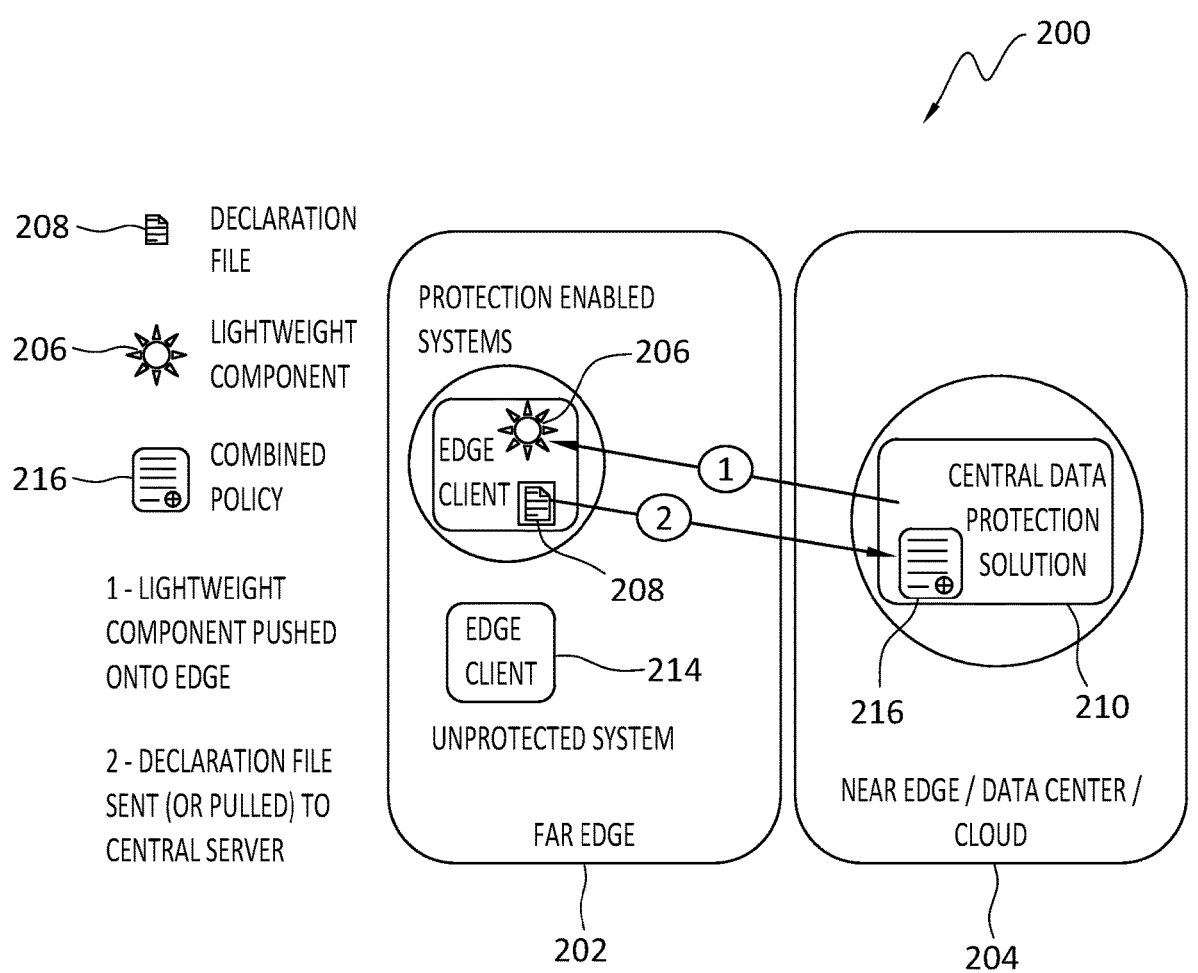
FIG. 2 discloses aspects of an example architecture and method, according to an embodiment.

With attention now to FIG. 2, details are provided concerning an example architecture 200, and associated entities and operations, according to one embodiment. As shown, the architecture 200 may comprise one or more edge nodes 202 configured to communicate with a central system 204 which may comprise a central server that may host, or comprise an element of, a data protection platform. Further information concerning these elements, and their relationships and operations, is set forth in the discussion. Particularly, the following discussion addresses, among other things (1) behavioral and operational policy attributes in edge systems, (2) discovery at edge and creation of an edge declaration file, (3) policy derivation, and (4) backup management and lifecycle.

C.1 Behavioral and Operational Policy Attributes

An embodiment may draw a distinction between policy attributes by separating the policy attributes into two categories, namely, behavioral, and operational. Behavioral attributes (general overall system) may include, for example, SLAs (service level agreements), definitions of critical/high/low priority data backup workloads, data backup schedules, data retention, and general preferences. On the other hand, operational attributes (edge node specific) may include, for example, asset/object/file/directory locations, repos (repositories), types of data to protect, target data storage locations for backed data, data backup cadence, that is, when/how often data will be backed up, and backup schedules, and data retention requirements. In some instances, behavioral attributes and operational attributes may overlap with each other, such as in the case of data backup schedules and data retention policies, as such attributes may have both behavioral and operational aspects.

In an embodiment, the operational attributes may have more to do with the nature of the protected asset, such as an edge node for example, or the platform that contains the asset. Thus, operational attributes may, in an embodiment, tend to be edge specific, and a central admin will have little to no knowledge or control over them, but they may still need to be determined in order to be able to define and execute an edge specific data protection policy. By way of contrast, behavioral attributes may, in an embodiment, be system wide and reflect the overall data protection preferences of a business entity or of an admin.

C.2 Discovery at the Edge, and Creation of an Edge Declaration File

In considering the definition of the operational attributes, it should be apparent that they may be comprise elements of the system that may have to scale with the system. Thus, to handle scale and scaling, an embodiment may operate to automatically derive the operational attributes of one, or more, edge locations. In an embodiment, these attributes may be platform, application, or asset, specific. Some, or all, of the knowledge about these attributes may be local to, that is, located at, the edge.

In more detail, and with continued reference to FIG. 2, a respective instance of a lightweight data protection component (LDPC) 206 may be deployed (1—in FIG. 2) by the central system 204 to each edge node 202. As disclosed elsewhere herein, an LDPC 206 may comprise various elements such as, but not limited to, a discovery module, a data backup scheduler, and a data mover.

One function of the LDPC 206 may be to automatically, upon deployment, discover local, that is, at the edge node 202, assets and configurations, and then to derive the operational parameters of the respective edge node 202. In an embodiment, the LDPC 206 may automatically create a declaration file 208 that contains information describing the attributes, assets, and configurations, that have been discovered by the LDPC 206. As shown in FIG. 2, the declaration file 208 may be stored at the edge node 202, and/or transmitted from the edge node 202 to a data protection platform 210 hosted at the central system 204. The declaration file 208 need not be of any particular type or format, nor be a file at all.

Thus, in one example embodiment, the declaration file 208 may comprise, rather than an actual file, a config section or attribute section of the platform, such as a Kubernetes config section for example. In any case however, the contents and use of the various forms of a declaration file 208 may be identical regardless of the form. Thus, reference herein to a 'declaration file' includes, but is not limited to, files, and other collections of data, metadata, and/or, information, not in the form of a file. Where the declaration file 208 is in the form of a file, it may have various different formats, examples of which are discussed below.

As further disclosed in FIG. 2, an edge node 202 may comprise one or more data protection enabled systems 212, which may also be referred to as 'edge clients,' and one or more edge clients 214 for which data protection has not been enabled. Thus, an embodiment may provide granularity in terms of the implementation of data protection, by providing data protection for some edge clients and, possibly, not other edge clients.

Attention is directed now to some further details concerning one example of a discovery process that may be performed by, and/or at the direction of, the LDPC 206. Respective instances of a discovery process may be performed by respective LDPCs 206 and respective edge nodes. One example discovery process may comprise various operations, and may be performed at one or more locations, which may or may not be determined prior to performance of the discovery process. Some example of such operations may include, but are not limited to: (1) enumerating platform (edge node) storage and scanning that storage for content for collections of data such as files and filesystems for example; (2) enumerating platform assets such as, for example, virtual machines (VMs), pods, and containers; (3) enumerating, and identifying, platform storage, and/or connected data storage systems configurations, as data storage targets; and (4) using application specific knowledge to identify and inventory any application(s) hosted at the edge node 202.

In an embodiment, applications that are hosted at the edge node 202, and are data protection aware, may export, or at least provide, a manifest file or config file in which the application provides location information, data sensitivity, data criticality, and data backup scheduling/duration information. The discovery process may harvest the information from the manifest files and add that information to the declaration file 208. Thus, an LDPC 206 may obtain information about an edge node 202 through the use of an active mechanism (discovery) and/or a passive mechanism (harvest of data collected in a manifest file).

As noted earlier, a declaration file 208 need not be of any particular format, nor even comprise a file. In some embodiments, however, a declaration file 208 may comprise, for example, a YAML (YAML ain't markup language) or JSON (JavaScript Object Notation) file format. In any case, a declaration file 208 may be sent to, or pulled by, the central system from the edge node 202 (2—in FIG. 2). In the latter case, a declaration file 208 may be placed at a predefined location on the edge node 202 to be picked up, or pulled, by the central system 204. By obtaining the declaration file 208, the central system 204 may be able to access, for each of one or more edge nodes 202, a list of local (edge) assets and a set of operational (edge) attributes, with possibly some additional edge preferences for data backup scheduling or data backup priority, if that information is provided by, or derived from, one or more applications hosted at an edge node 202.

In an embodiment, an edge node 202 may automatically update its declaration file 208 to reflect changes occurring with the data and/or configuration of that edge node 202. The updated declaration file 208 may be automatically communicated to, or pulled by, the central system 204. The central node 204 may determine the existence of a new/updated declaration file 208 by polling the edge node 202, or based on a notification received from an edge node 202 indicating that a new/updated declaration file 208 has been created by that edge node 202.

Following is one illustrative, and non-limiting, example of a declaration file 208. The example declaration file may include, but is not limited to:

AssetType: VM/Pod/FileSystem/DB
Location: ObjectStore 3
Schedule: Daily
Retention: 7 days
Sensitivity: High
Criticality: Low As shown in this illustrative example, a declaration file may identify the type of a particular edge node data asset to be protected, and the location of that asset at the edge node. The declaration file may also identify the frequency with which the asset should be backed up ('Schedule'), and the amount of time for which the backup should be retained before being flushed from storage ('Retention'). This example declaration file may also indicate whether or not particular data is confidential or business sensitive ('Sensitivity'), and the criticality, or importance, of the data, relative to other edge node 202 data, to be protected ('Criticality'). Additional, or alternative, attributes may be included in a declaration file.

C.3 Policy Derivation

C.3.1 Overview

Following is discussion of some general aspects of entities and operations that may be involved in policy building and policy derivation. These are provided by way of example and are not intended to limit the scope of the invention in any way.

In some embodiments, a central system may have multiple behavioral policies, and/or operational policies, available for selection for inclusion in a hybrid data protection policy. As noted elsewhere herein, operational policies may be specific to a single edge node, or to a subset of the total number of edge nodes. Behavioral, or central, policies may vary according to any number of constraints and requirements such as, for example, requirements specified by an SLA (service level agreement). An example SLA may provide, for example, for 'gold,' 'silver,' or 'bronze,' levels of data protection where a 'gold' level may provide for more frequent backups than a 'silver' or 'bronze' level. Another example of constraints and requirements that may control or influence a behavioral policy and/or an operational policy includes specific data protection attributes such as a designation of the data as "high security," or a requirement that three backup copies of the data be retained, that is, a "3-copy backup."

It will be appreciated that as the number of edge locations increases, assigning individualized policies to each of the edge locations would quickly become problematic. Thus, attributes in a declaration file may help in this regard. For example, a central system or admin may select, as a default data protection rule, a rule that all edge devices use a 'silver' data protection policy. However, a specific edge node may determine that it has highly sensitive data, and may note that in the declaration file created at that edge node. The central system may then decide, for that particular edge node, whether to retain the default 'silver' policy for data protection, or to switch to a high-security data protection policy that may be more appropriate for the data of that edge node.

Within the bounds of the 'high-security' data protection policy, the central system may further examine attributes from the declaration file—such as, for example, data sensitivity, sovereignty concerns, and edge node performance—to determine, for example, which particular edge node data should be protected, how, and when. Thus, data protection policies may have multiple levels of granularity. As such, an embodiment may generate a hybrid data protection policy that not only accounts for requirements that are specific to an edge node, but which also incorporates overall behavioral policies that govern data protection at all the edge nodes. This functionality may be useful inasmuch as the central system may not have the knowledge of, nor the ability to handle, the unique aspects of each edge node.

As noted herein, a hybrid, or 'combined,' data protection policy applicable to an edge node may comprise certain default values, one or more of which may possibly be assigned by the central system, that may respectively apply to various behavioral and/or operational attributes pertaining to that edge node. In an embodiment, an edge node may override a data protection policy default value with a value that is included in a declaration file generated by/at that edge node. The following hypothetical example is illustrative.

Suppose that there is a central system that manages a fleet of autonomous vehicles (AV). Included in the fleet is a minivan AV1 that is used for taxi services. The fleet also includes a minivan AV2, of the same make/model as AV1, but also fitted with a weather gathering experiment that collects environmental information as AV2 travels about. As AV1 and AV2 are the same make and model, the central system may assume that AV1 and AV2 are used/managed/protected in the same way. But AV2 clearly has different data protection needs than those of AV1.

Based on the central system assumption about the respective data protection needs of AV1 and AV2, a central system may simply assign different respective data protection policies to AV1 and AV2. However, that central system may lack, and be unable to access, specific information about each of AV1 and AV2. On the other hand, however, AV2 may be aware of its state, and can figure out some of the changes needed to adapt data protection to its unique situation and configuration. Thus, and by way of illustration, an embodiment may comprise a system that provides AV2 with the flexibility to override, possibly automatically, some of the default values, assigned by the central system, that may suit AV1 but not AV2. Other aspects of a hybrid data protection policy may stay the same, and those may be centrally managed by the central system. Thus, an embodiment may provide edge node uniqueness, at scale throughout an edge computing environment.

C.3.2 Policy Derivation/Building

With reference again now to FIG. 2, and keeping in mind the points noted in the earlier discussion, an embodiment may use a respective declaration file 208 from one or more edge nodes 202, in combination with any centrally managed behavioral attributes, to derive, or build, a hybrid data protection policy, which may also be referred to herein as a 'combined' policy 216, that may include edge node-specific attributes, as well as attributes that may be generally applicable across multiple edge nodes. This derivation or building of the hybrid data protection policy 216 may be performed, in an embodiment, by the central system 204. As noted, this initial iteration of the hybrid data protection policy may be modified by the edge node 202, or by the central system 204 on instruction from the edge node 202.

In an embodiment, the derivation of a hybrid data protection policy 216 may comprise various considerations and operations. Examples of such considerations and operations may include, but are not limited to:

[1] consideration of data asset type, data priority, data sensitivity, and/or other designations specified in the declaration file—these may be used by the central system to help determine which central policy to use—note that there may not be a one-to-one match between these considerations and a particular policy, and rules, preferences, and defaults may also inform this determination;

[2] once a central policy is chosen, the central data protection policy, comprising behavioral attributes, may provide default values to some or all of the data protection policy attributes and the operational attributes—any operational attributes or preferences from the declaration file, and specific to an edge node, may override one or more of the default values that may have been assigned by the central system to operational attributes—in an embodiment, behavioral attributes cannot be overridden by the edge node; and

[3] in an embodiment, the central system may, in its discretion, override one or more values of a behavioral attribute and/or one or more values of an operational attribute.

One result of these operations and considerations may be a hybrid, or merged, data protection policy that takes into account the asset definition and location from the edge information and may be used to apply the requested data protection behavior. Note that changes in the central policies may be applied relatively easily, and there may be no need for the backup admin to be aware of edge specific information. Therefore, management of data backup policies, at scale, may be achieved, possibly automatically and without admin intervention or other involvement.

C.4 Backup Management and Lifecycle

In an embodiment, the LDPC 206 may be deployed on the edge, that is, at one or more edge nodes 202. As noted elsewhere herein, in addition to the discovery functionality discussed earlier, an LDPC 206 may include a scheduler and data mover for a given specific data protection workload type such as, for example, a file system, a containerized application, or a VM.

The LDPC 206 may be deployed in various ways. For example, the LDPC 206 may be implemented as a deployed service of an edge computing environment deployment platform. In another example, the LDPC 206 may be installed, possibly automatically, by the data protection platform 210 when a new edge node 202 is added to the system.

In any case, once the LDPC 206 is active at the edge node 202 and performing discovery, the declaration file 208 may be generated by the LDPC 206 and sent (or is pulled) to the data protection platform 210. In addition to attributes contained in a data protection policy, a list, which may be included in the declaration file 208 as a result of a discovery process by the LDPC 206, of the edge data assets may provide insights into what data protection workloads need to be performed to support an edge node 202. While a full-fledged backup software, such as the data protection platform 210 for example, may be able to perform all data protection workloads, an edge node 202 may only be capable of performing, for example, one or two data protection workloads. In an embodiment, the LDPC 206 may only need drivers for the identified data protection workloads that the edge node 202 is capable of performing itself, since the other data protection workloads may be performed centrally by the data protection platform 210. As noted, the LDPC 206 may include a scheduler module. The scheduler module may be operable to implement the central policy instructions with respect to data protection at the edge node 202 where the LDPC 206 is deployed.

As noted elsewhere herein, an embodiment of the LDPC 206 may be relatively lightweight, comprising, or consisting of, respective modules to implement the following: [1] discovery functionality; [2] scheduler to schedule backup workloads; [3]workload drivers for data protection workloads to be performed at the edge node 202 where the LDPC 206 is deployed; and [4] basic monitoring to track any changes at the edge node 202 that imply a modification of a data protection policy attribute. Because the LDPC 206 may perform these functions automatically, without involvement or intervention by an admin, the LDPC 206 may omit a UI, and may not operate to perform any reporting from the edge node 202 to the central system 204. Thus, when a data protection policy 216 is derived at/by the central system 204, the data protection policy 216 may be sent by the central system to the LDPC 206 at the edge node 202, and the processes implicated by the data protection policy 216 carried out locally at the edge node 202. In this way, backup management for one or more edge nodes 202 may be distributed across an edge computing environment, such as the environment 100 disclosed in FIG. 1, for example.

D. Example Methods

Figure 3:
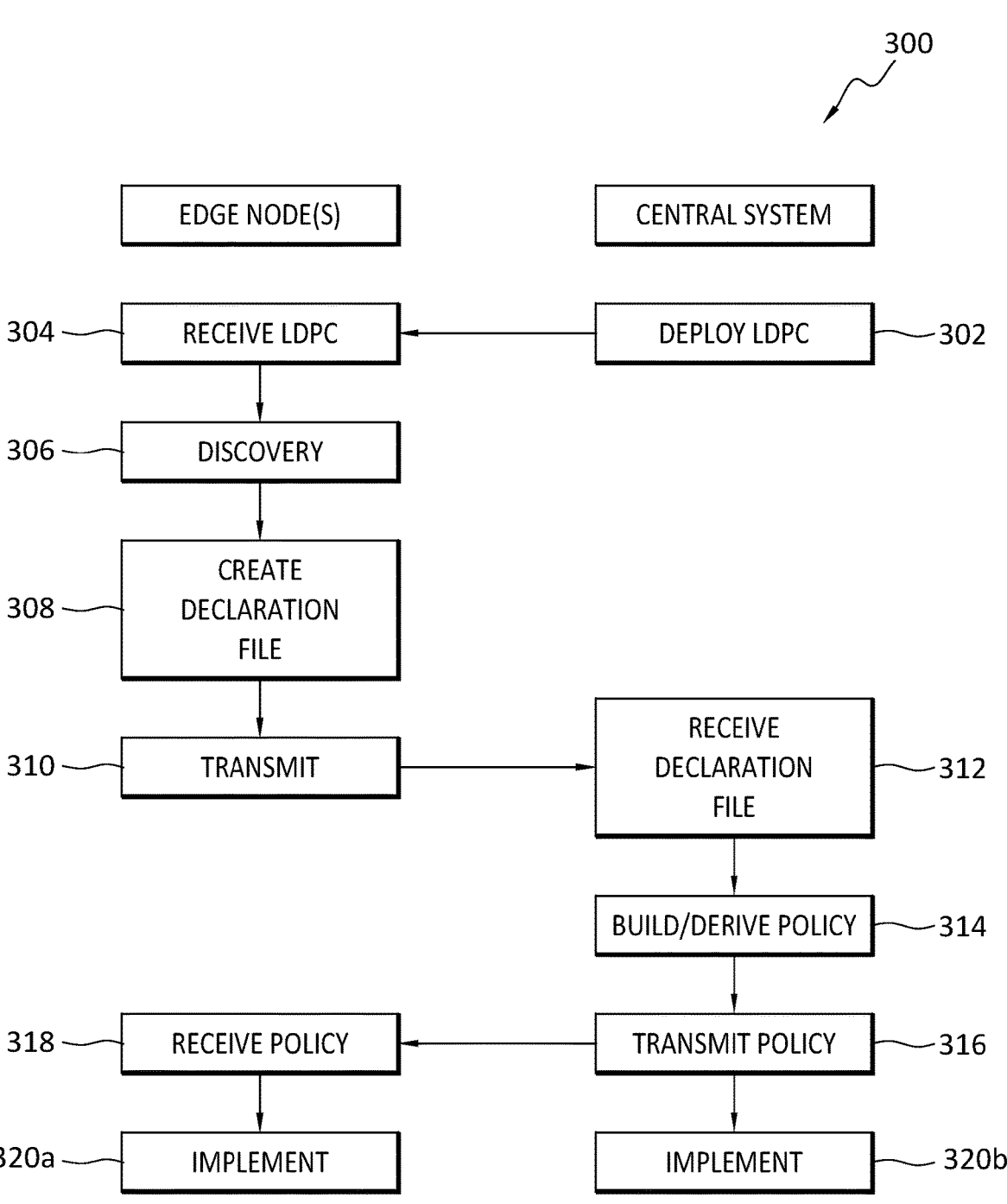
FIG. 3 discloses aspects of a method, according to an embodiment.

It is noted with respect to the disclosed methods, including the example method of FIG. 3, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited. Any of the disclosed methods may be performed by one or more special-purpose computers and/or one or more special-purpose computing systems.

Directing attention now to FIG. 3, a method according to one example embodiment is denoted generally at 300. The method 300 may be performed in whole, or in part, at one or more edge nodes and/or, by a data protection platform hosted at a central system. The functional allocation disclosed in FIG. 3 is provided only by way of example, and is not intended to limit the scope of the invention in any way. In an embodiment, the example method 300 may be performed after a new, or modified, edge node has been added to an edge computing environment. Detection of this addition of the edge node may be performed by a central system.

The example method 300 may begin when the central node deploys 302 an LDPC to an edge node. The deployment 302 may be performed automatically after the edge node has been detected as having joined an edge computing environment. The edge node may then receive 304 the LDPC, and a discovery process 306 may then be performed by the LDPC at the edge node. The discovery process 306 may identify various operational aspects that are specific to the edge node, and which may have implications with respect to a data protection operation to be performed concerning new/modified data generated by/at the edge node.

The operational aspects identified by the discovery process may be captured in a declaration file created 308 by the LDPC. The declaration file may then be transmitted 310 by the edge node to the central system. The central system may receive 312 the declaration file, and then derive/build 312 a policy by selecting a data protection policy for the edge node, and then merging operational attribute information from the declaration file into the data protection policy to define a hybrid data protection policy that may be specific to the edge node.

The hybrid data protection policy may then be transmitted 316 by the central system to the edge node. The edge node may receive 318 the hybrid data protection policy, and the edge node and the central system may then implement 320a and 320b respective elements of the data protection policy. In an embodiment, the edge node may perform whatever data protection workloads that its resources, such as memory, storage, and processing, can support, while the central system may perform the data protection workloads that the edge node is not capable of performing. Thus, a hybrid data protection policy may be generated and implemented that is specific to the edge node, while also incorporating data protection policies generally applicable across an edge computing environment that includes the edge node.

E. Further Discussion

As will be apparent from this disclosure, an embodiment of the invention may possess various useful features and advantages. A non-exhaustive list of such features and advantages is set forth below.

For example, an embodiment may define and implement a centrally managed data protection policy using collaborative automated discovery of protection policy configuration for edge locations at scale. As another example, an embodiment may provide for ease of data protection management in dynamic, large-scale, edge computing environments. An embodiment may implement automated edge protection attributes discovery, data protection policy derivation, and provision of edge node information to a central system, at scale. An embodiment may define and implement a collaborative, such as by an edge node and a central system, data protection configuration. In one example of such an implementation, operational attributes relating to data protection may be governed by the edge node(s), while behavioral attributes included in one or more data protection policies may be governed by a central system. The operational attributes and behavioral attributes may be intelligently merged by/at a central system to create a hybrid data protection policy.

F. Further Example Embodiments

Following are some further example embodiments of the invention. These are presented only by way of example and are not intended to limit the scope of the invention in anyway.

Embodiment 1. A method, comprising: deploying a lightweight data protection component to an edge node of an edge computing environment; receiving, from the edge node, a declaration file comprising an operational attribute that is specific to data residing at the edge node; choosing a central data protection policy; deriving, using the central data protection policy, a hybrid data protection policy that comprises the operational attribute; and transmitting the hybrid data protection policy to the edge node, and the hybrid data protection policy is configured, when executed, to perform a data protection operation on the data residing at the edge node.

Embodiment 2. The method as recited in embodiment 1, wherein the hybrid data protection policy further comprises a behavioral attribute that is not specific to the edge node.

Embodiment 3. The method as recited in any of embodiments 1-2, wherein the declaration file is generated by a discovery processed performed by the lightweight data protection component at the edge node.

Embodiment 4. The method as recited in any of embodiments 1-3, wherein the deploying of the lightweight data protection component is performed automatically based on detection of the edge node.

Embodiment 5. The method as recited in any of embodiments 1-4, wherein the lightweight data protection component is executable at the edge node to discover the operational attribute.

Embodiment 6. The method as recited in any of embodiments 1-5, wherein a default operational attribute value in the central data protection policy is overwritten based on the operational attribute in the declaration file.

Embodiment 7. The method as recited in any of embodiments 1-6, wherein the lightweight data protection component comprises a discovery module, a scheduler module, a workload driver, and a monitoring module.

Embodiment 8. The method as recited in any of embodiments 1-7, wherein the data residing at the edge node is backed up according to the hybrid data protection policy.

Embodiment 9. The method as recited in any of embodiments 1-8, wherein the declaration file comprises one or more of: an asset type of the edge node; a location of the data at the edge node; a backup schedule for the data; a retention time period for a backup of the data; and, a sensitivity value of the data.

Embodiment 10. The method as recited in any of embodiments 1-9, wherein the deriving of the hybrid data protection policy is performed automatically.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
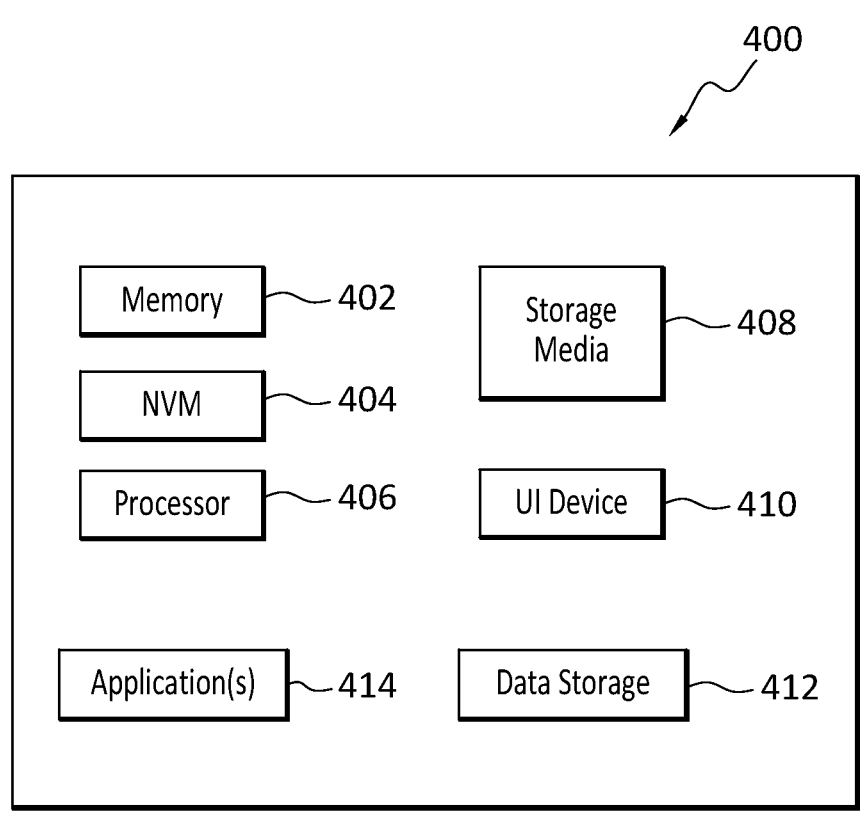
FIG. 4 discloses an example computing system configured to perform any of the disclosed methods, processes, and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI (user interface) device 410, and data storage 412. One or more of the memory components 402 of the physical computing device 404 may take the form of solid state device (SSD) storage. As well, one or more applications 414 may be provided that comprise instructions executable by one or more hardware processors 402 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

deploying a lightweight data protection component to an edge node of an edge computing environment, wherein the lightweight data protection component performs data replication operations, IO replication operations, data read/write/delete operations, data deduplication operations, data backup operations, data restore operations, data cloning operations, data archiving operations, and disaster recovery operations;

creating, by the lightweight data protection component, at the edge node, a declaration file comprising an operational attribute that is specific to data residing at the edge node, wherein the declaration file identifies a type of data asset in the edge node to be protected and a location of the data asset at the edge node;

receiving, from the edge node, the declaration file;

choosing a central data protection policy;

deriving, using the central data protection policy, a hybrid data protection policy that comprises the operational attribute of the edge node based on the declaration file; and transmitting the hybrid data protection policy to the edge node, and the hybrid data protection policy is configured, when executed, to perform a data protection operation on the data residing at the edge node.

2. The method as recited in claim 1, wherein the hybrid data protection policy further comprises a behavioral attribute that is not specific to the edge node.

3. The method as recited in claim 1, wherein the declaration file is generated by a discovery processed performed by the lightweight data protection component at the edge node.

4. The method as recited in claim 1, wherein the deploying of the lightweight data protection component is performed automatically based on detection of the edge node.

5. The method as recited in claim 1, wherein the lightweight data protection component is executable at the edge node to discover the operational attribute.

6. The method as recited in claim 1, wherein a default operational attribute value in the central data protection policy is overwritten based on the operational attribute in the declaration file.

7. The method as recited in claim 1, wherein the lightweight data protection component comprises a discovery module, a scheduler module, a workload driver, and a monitoring module.

8. The method as recited in claim 1, wherein the data residing at the edge node is backed up according to the hybrid data protection policy.

9. The method as recited in claim 1, wherein the declaration file comprises one or more of: backup schedule for the data; a retention time period for a backup of the data; and, a sensitivity value of the data.

10. The method as recited in claim 1, wherein the deriving of the hybrid data protection policy is performed automatically.

11. A non-transitory storage medium having stored therein instructions that are executable by one or more hardware processors to perform operations comprising:

deploying a lightweight data protection component to an edge node of an edge computing environment, wherein the lightweight data protection component performs data replication operations, IO replication operations, data read/write/delete operations, data deduplication operations, data backup operations, data restore operations, data cloning operations, data archiving operations, and disaster recovery operations;

creating, by the lightweight data protection component, at the edge node, a declaration file comprising an operational attribute that is specific to data residing at the edge node, wherein the declaration file identifies a type of data asset in the edge node to be protected and a location of the data asset at the edge node;

receiving, from the edge node, the declaration file;

choosing a central data protection policy;

deriving, using the central data protection policy, a hybrid data protection policy that comprises the operational attribute of the edge node based on the declaration file; and transmitting the hybrid data protection policy to the edge node, and the hybrid data protection policy is configured, when executed, to perform a data protection operation on the data residing at the edge node.

12. The non-transitory storage medium as recited in claim 11, wherein the hybrid data protection policy further comprises a behavioral attribute that is not specific to the edge node.

13. The non-transitory storage medium as recited in claim 11, wherein the declaration file is generated by a discovery processed performed by the lightweight data protection component at the edge node.

14. The non-transitory storage medium as recited in claim 11, wherein the deploying of the lightweight data protection component is performed automatically based on detection of the edge node.

15. The non-transitory storage medium as recited in claim 11, wherein the lightweight data protection component is executable at the edge node to discover the operational attribute.

16. The non-transitory storage medium as recited in claim 11, wherein a default operational attribute value in the central data protection policy is overwritten based on the operational attribute in the declaration file.

17. The non-transitory storage medium as recited in claim 11, wherein the lightweight data protection component comprises a discovery module, a scheduler module, a workload driver, and a monitoring module.

18. The non-transitory storage medium as recited in claim 11, wherein the data residing at the edge node is backed up according to the hybrid data protection policy.

19. The non-transitory storage medium as recited in claim 11, wherein the declaration file comprises one or more of: backup schedule for the data; a retention time period for a backup of the data; and, a sensitivity value of the data.

20. The non-transitory storage medium as recited in claim 11, wherein the deriving of the hybrid data protection policy is performed automatically.

\* \* \* \* \*